Oct. 27, 1936.　　　　C. ZIMMER　　　　2,058,937
AUTOMOBILE FUEL PUMP ROCKER ARM GAUGE
Filed April 30, 1936　　　2 Sheets-Sheet 1
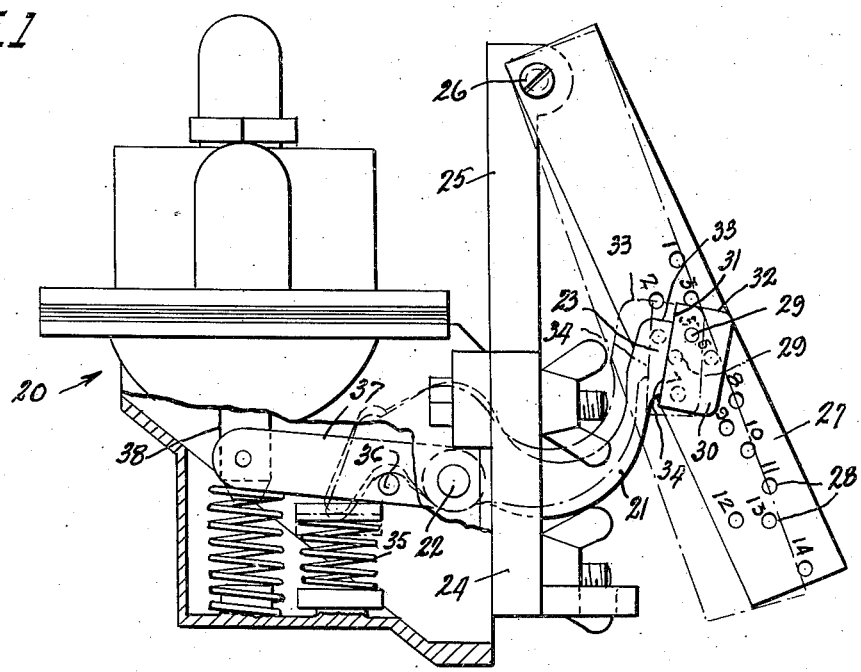
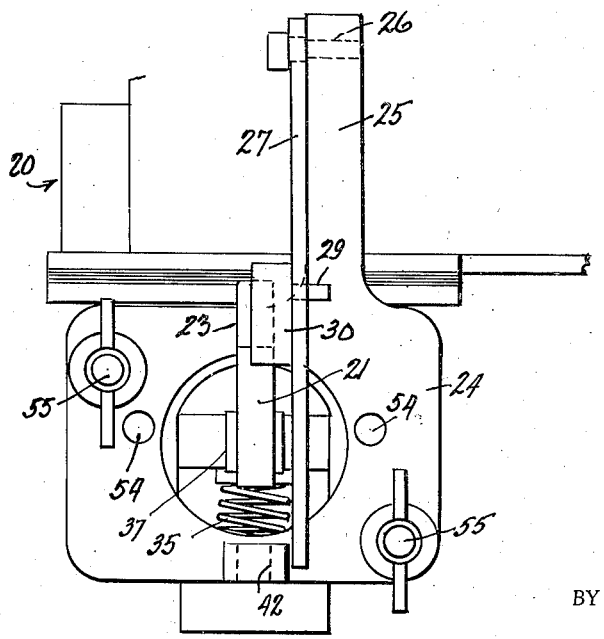
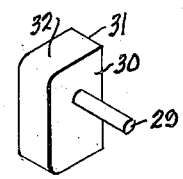
INVENTOR.
Charles Zimmer
Joshua C. Davidson
ATTORNEY.

Oct. 27, 1936.   C. ZIMMER   2,058,937
AUTOMOBILE FUEL PUMP ROCKER ARM GAUGE
Filed April 30, 1936   2 Sheets-Sheet 2
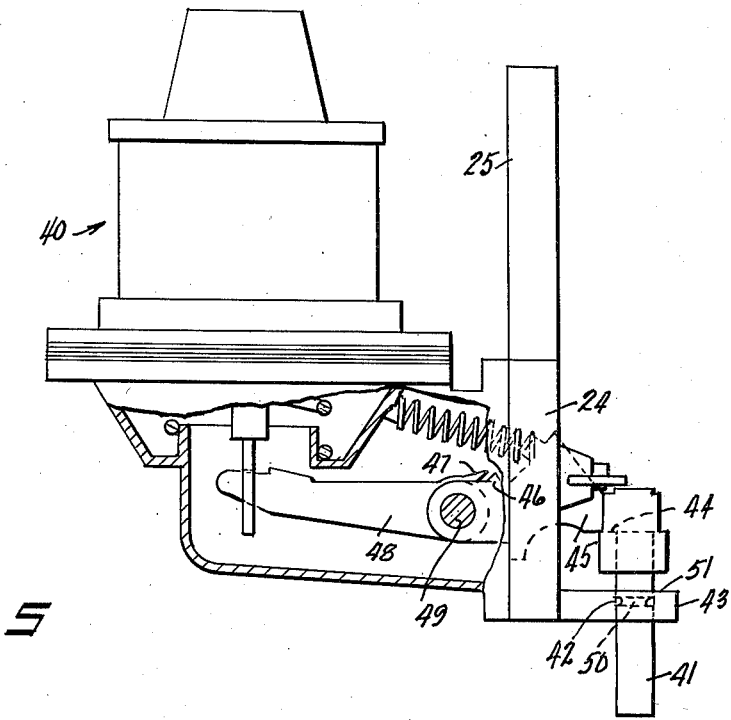
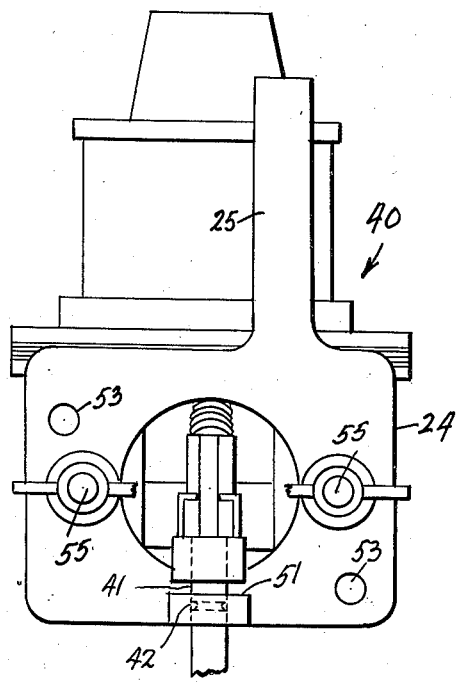
INVENTOR.
Charles Zimmer
BY Joshua C. Davidson
ATTORNEY Patented Oct. 27, 1936

2,058,937

UNITED STATES PATENT OFFICE 2,058,937

AUTOMOBILE FUEL PUMP ROCKER ARM GAUGE

Charles Zimmer, Brooklyn, N. Y.

Application April 30, 1936, Serial No. 77,096

3 Claims. (Cl. 33—181)

This invention relates to automobile fuel pump gauges and has for one of its objects the provision of such a gauge for measuring and determining the inaccuracies of the rocker arms of such pumps due to wear.

Another object of the invention is to provide such a gauge whereby it may be determined whether or not the proper rocker arm has been assembled with the pump.

A further object of the invention is to provide a gauge of this nature which may be used in connection with all of the various types of automobile fuel pumps.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which—

Figure 1 is a side elevation of a pump partly broken away, showing my improved gauge applied thereto;

Fig. 2 is an end view thereof looking from the right of Fig. 1;

Fig. 3 is a perspective view of the gauge block;

Fig. 4 is a similar view to Fig. 1 of a different type of pump showing my gauge applied thereto;

Fig. 5 is an end view looking from the right of Fig. 4 and

Fig. 6 is a perspective view of the gauge pin or plug used in connection with this type of pump.

Referring to Figs. 1 to 3 of the drawings in detail 20 indicates a fuel pump which is provided with a rocker arm 21 pivoted at 22. In the type pump illustrated in Figs. 1 and 2 the rocker arm 21 is operated directly by the cam on the cam shaft of the motor, the cam coming in direct contact with the upper portion 23 of the said rocker arm. Due to the fact that the relative position of the said pump with respect to the cam shaft varies in the various makes of automobiles, the rocker arm 21 has to be made in various sizes and shapes to accommodate these differences in position.

In order that all of the various rocker arms may be gauged in order to determine the inaccuracies due to wear either at the point of cam contact, pivot point or other places, I provide a bracket 24 provided with an upstanding extension 25 upon which there is pivotally mounted at 26 a plate 27 having a plurality of openings 28 numbered from 1 to 14 to accommodate or receive a pin 29 extending from a block 30. The position of the pin 29 with respect to the gauging surfaces 31 and 32 of the block 30 is so arranged that when the normal amount of play or lost motion of the lever arm 21 is taken up the surface 32 will be directly in line with the top surface 33 of the rocker arm 21 and the surface 31 will be flat against the cam contacting of the rocker arm surface 34 with no space between them. The various sized and shaped rocker arms may be numbered correspondingly to the numbers of the holes 28 on the plate 27.

In practice when it is desired to gauge or test any pump, the pin 29 of the block 30 is inserted into the hole or opening corresponding to the particular rocker arm of the pump with the surface 31 of the block 30 against the surface 34 of the rocker arm and the plate 27 is swung upon its pivot 26. This action causes the lever arm 21 to rock upon its pivot 22 against the tension of a spring 35 until the said arm contacts a pin 36 carried by a link 37 pivoted at one end at 22 and in engagement at its opposite end with the diaphragm rod 38. The aforementioned action takes up all of the play of the rocker arm and the pump is in position for effective pumping operation. If in this position the block 30 and the end 23 of the rocker arm do not line up properly, the lever arm is worn to such an extent that the pump no longer functions correctly. The above operation may also be used to determine whether or not the proper rocker arm has been assembled with the pump.

In Figs. 4 to 6 I have shown the bracket 24 secured to a pump 40 which may be called the push-rod type. In this form of my invention I utilize a gauge pin or plug 41 which is adapted to pass through an opening 42 in an extension or lug 43 at the bottom of the bracket 24 and engage the bottom surface 44 of a rocker arm 45.

By pushing the said pin upwardly to rock the arm 45 on its pivot 49 until the projection 46 thereon engages a projection 47 on the diaphragm stem engaging or actuating arm 48 also pivoted at 49. If in this position the bottom of the groove 50 shows any appreciable distance above the top surface 51 of the lug 43 the rocker arm has to be replaced on account of wear. The groove 50 on the pin 41 is so located that normally before the rocker arm is worn and when the pin is pushed upwardly until the normal play is taken up and the projections 46 and 47 make contact, the bottom of the groove 50 will be even with the top of the surface 51.

The bracket 24 is provided with two sets of openings 53 and 54 through which pass securing bolts 55 which also pass through the openings in the pump casings the said casing openings being utilized to secure the pumps in place.

It will be noted that the relative leverages between the rocker arms 21 and 45 and their respective connections 37 and 48 is such that but a very slight lost motion or wear of the rocker arms will be greatly multiplied at the diaphragm-stem connection. For the above reason great accuracy in the testing gauge is essential and inasmuch as my improved gauge is secured to the pump through the same openings that are utilized for securing the pumps in their respective places, the same conditions exist in the gauge as in the automobile before any wear on the rocker arms occurs.

From the foregoing it will be seen that I have provided a testing gauge for automobile fuel pump-rocker arms which may be used in connection with all of the variously known pumps now on the market and wherein the inaccuracies due to wear or otherwise may be accurately and quickly determined.

Having described my invention what I claim as new and desire to secure by Letters Patent is:

1. A gauge for testing automobile fuel-pump-rocker arms, comprising a bracket adapted to be secured to the pump casing, a perforated extension on the said bracket, a perforated plate pivotally mounted on the said extension, and a testing block operably mounted on the perforated plate for engagement with the rocker arm.

2. A gauge for testing automobile fuel-pump-rocker arms, comprising a bracket adapted to be secured to the pump casing, a perforated extension on the said bracket, a plate having a multiplicity of openings pivotally mounted on the extension, and a testing block adapted to be operably mounted in any of the plate openings for the purpose specified.

3. A gauge for testing automobile fuel-pump-rocker arms, comprising a bracket adapted to be secured to the pump casing, a plate having a multiplicity of openings pivotally mounted on the said bracket, a rocker arm testing plate, and means on the said testing plate adapted to be received by any of the plate openings.

CHAS. ZIMMER.